United States Patent
Horn (10) Patent No.: US 9,875,031 B2
(45) Date of Patent: Jan. 23, 2018

(54) DATA RETENTION MANAGEMENT FOR DATA STORAGE DEVICE

(71) Applicant: Western Digital Technologies, Inc., Irvine, CA (US)

(72) Inventor: Robert L. Horn, Yorba Linda, CA (US)

(73) Assignee: Western Digital Technologies, Inc., San Jose, CA (US)

(*) Notice: Subject to any disclaimer, the term of this patent is extended or adjusted under 35 U.S.C. 154(b) by 204 days.

(21) Appl. No.: 14/870,562

(22) Filed: Sep. 30, 2015

(65) Prior Publication Data

US 2017/0090777 A1    Mar. 30, 2017

(51) Int. Cl.
G06F 3/06    (2006.01)

(52) U.S. Cl.
CPC .......... *G06F 3/0608* (2013.01); *G06F 3/0649* (2013.01); *G06F 3/0652* (2013.01); *G06F 3/0673* (2013.01)

(58) Field of Classification Search
CPC .... G06F 3/0608; G06F 3/0673; G06F 3/0652; G06F 3/0638; G06F 3/0641; G06F 3/0649; G06F 3/0647; G06F 3/067; G06F 3/0689; H04N 19/428; H04N 19/426; H04N 19/423; H04N 19/433
See application file for complete search history.

(56) References Cited

U.S. PATENT DOCUMENTS

| | | | |
|---|---|---|---|
| 5,724,475 A * | 3/1998 | Kirsten | G08B 13/19645 348/E7.086 |
| 6,940,873 B2 | 9/2005 | Boyle et al. | |
| 6,986,019 B1 | 1/2006 | Bagashev et al. | |
| 8,417,846 B2 | 4/2013 | Brune et al. | |
| 8,832,044 B1 | 9/2014 | Gipp et al. | |
| 9,024,779 B2 | 5/2015 | Hershey et al. | |
| 2009/0083336 A1* | 3/2009 | Srinivasan | G06F 11/1448 |
| 2012/0109908 A1* | 5/2012 | Barsness | G06F 17/30289 707/693 |
| 2012/0158669 A1* | 6/2012 | Morsi | G06F 17/30085 707/689 |
| 2012/0290789 A1 | 11/2012 | Susarla et al. | |
| 2013/0304723 A1* | 11/2013 | Konik | G06F 17/30483 707/718 |
| 2014/0348492 A1 | 11/2014 | Watanabe et al. | |
| 2015/0032418 A1* | 1/2015 | Akiyama | G07C 5/085 702/190 |
| 2015/0134619 A1* | 5/2015 | Factor | G06F 17/30085 707/663 |
| 2016/0344983 A1* | 11/2016 | Yoshimura | H04N 7/185 |

OTHER PUBLICATIONS

Robert L. Horn, et al., U.S. Appl. No. 14/871,054, filed Sep. 30, 2015, 35 pages.

\* cited by examiner

*Primary Examiner* — Michael Krofcheck
(74) *Attorney, Agent, or Firm* — Barry IP Law (57) ABSTRACT

Data is received for storage in at least one memory of a Data Storage Device (DSD) and metadata associated with the received data is generated. The received data and the generated metadata are stored in the at least one memory and the retention of the received data is managed based on the generated metadata.

25 Claims, 7 Drawing Sheets

DATA RETENTION MANAGEMENT FOR DATA STORAGE DEVICE

CROSS REFERENCE TO RELATED APPLICATION

This application is related to co-pending application Ser. No. 14/871,054 filed on Sep. 30, 2015, and entitled "MEDIA REGION MANAGEMENT FOR DATA STORAGE DEVICE" by Robert Horn, which is hereby incorporated by reference in its entirety.

BACKGROUND

Data Storage Devices (DSDs) are often used to record data onto or to reproduce data from a storage media such as a rotating magnetic disk or a solid-state memory. In some cases, DSDs may be used to archive or store data received from one or more sensing devices such as, for example, video cameras, accelerometers, microphones, or various other sensors. The data received from such sensing devices may arrive at the DSD as a continuous stream of data and eventually consume large amounts of the available storage capacity in the DSD. Since the storage capacity of the DSD is limited, new data may simply overwrite older data without any consideration of the importance of the older data.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
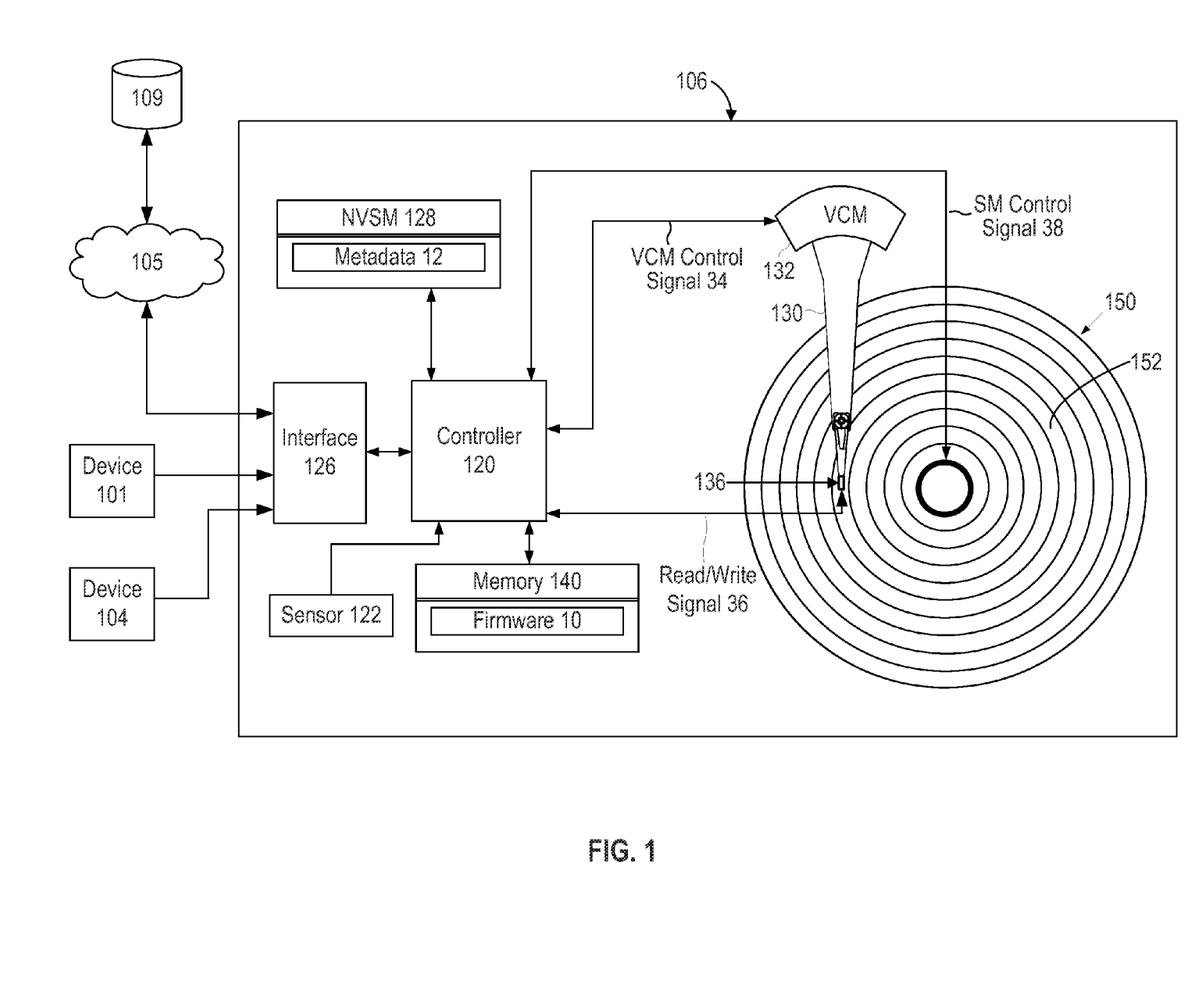
FIG. 1 is a block diagram depicting a Data Storage Device (DSD) according to an embodiment.

FIG. 1 shows an example of Data Storage Device (DSD) 106 which receives data from devices 101 and 104 according to an embodiment. Devices 101 and 104 can include sensing devices such as, for example, a video camera, accelerometer, microphone, motion sensor, temperature sensor, humidity sensor, light sensor, or other type of sensing device. In addition, DSD 106 communicates with remote DSD 109 via network 105, which can include a Local Area Network (LAN), Wide Area Network (WAN), or the Internet.

As shown in the example embodiment of FIG. 1, DSD 106 includes Non-Volatile Memory (NVM) in the form of rotating magnetic disk 150 and Non-Volatile Solid-State Memory (NVSM) 128. In other embodiments, DSD 106 can include other NVM media such as magnetic tape. In this regard, one or both of disk 150 and NVSM 128 can be omitted or replaced by a different NVM media. For example, NVSM 128 may be omitted in some embodiments so that the NVM of DSD 106 includes only disk storage media. In yet other embodiments, each of disk 150 or NVSM 128 can be replaced by multiple Hard Disk Drives (HDDs) or multiple Solid-State Drives (SSDs), respectively, so that DSD 106 includes pools of HDDs and/or SSDs.

DSD 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC).

Interface 126 is configured to interface DSD 106 with devices 101 and 104, and with network 105 and may interface using, for example, Ethernet or WiFi, and/or one or more bus standards. As will be appreciated by those of ordinary skill in the art, interface 126 can be included as part of controller 120.

The components of FIG. 1 may or may not be physically co-located. In this regard, devices 101 or 104 may be located remotely from DSD 106. Those of ordinary skill in the art will also appreciate that other embodiments can include more or less than those elements shown in FIG. 1 and that the disclosed processes can be implemented in other environments. For example, other embodiments can include a different number of devices providing data to DSD 106.

In the example of FIG. 1, DSD 106 includes sensor 122, which can also provide data for storage in at least one NVM of DSD 106. Sensor 122 can include, for example, an accelerometer or a temperature sensor to detect an environmental condition. In other embodiments, sensor 122 can be external to DSD 106 as with devices 101 and 104.

In FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks 152. A servo system (not shown) of controller 120 controls the rotation of disk 150 with SM control signal 38 and controls the position of head 136 using VCM control signal 34.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

DSD 106 may also include NVSM 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 1, NVSM 128 stores metadata 12 which is associated with the data received from devices 101 and 104 or from sensor 122. As discussed in more detail below, controller 120 generates metadata 12 for managing the retention or a size of the received data after it has been stored in NVM of DSD 106. In this way, it is ordinarily possible to determine which data should be kept and which data can be deleted, compressed or transferred to another DSD when more space is needed in the NVM of DSD 106. As used herein, compression can include a reduction in a sampling rate of the data, such as the removal of frames from video data to result in a lower quality video or the application of one or more lossless or lossy compression algorithms as known in the art.

DSD 106 also includes memory 140, which can include, for example, a Dynamic Random Access Memory (DRAM). In some embodiments, memory 140 can be a volatile memory used by DSD 106 to temporarily store data. In other embodiments, memory 140 can be an NVM that can be quickly accessed. Data stored in memory 140 can include data read from NVM, data to be stored in NVM, instructions loaded from firmware 10 for execution by controller 120, and/or data used in executing firmware 10.

In operation, interface 126 receives data from devices 101 and 104 via interface 126 for storing the data in NVM of DSD 106. Controller 120 may buffer the received data in memory 140 before storing the data on disk 150 or in NVSM 128.

For data to be written on disk 150, a read/write channel (not shown) of controller 120 may encode the buffered data into write signal 36 which is provided to head 136 for magnetically writing data on disk 150. A servo system of controller 120 can provide VCM control signal 34 to VCM 132 to position head 136 over a particular track for writing the data.

In addition, controller 120 may need to read data from NVM to manage retention of the stored data or to provide the stored data to another device. To read data from disk 150, the servo system positions head 136 over a particular track on disk 150. Controller 120 controls head 136 to magnetically read data stored in the track and to send the read data as read signal 36. A read/write channel of controller 120 can then decode and buffer the data into memory 140 for use by controller 120 or for transmission to another device via interface 126.

For data to be stored in NVSM 128, controller 120 receives data from interface 126 and may buffer the data in memory 140. In one implementation, the data is then encoded into charge values for charging cells (not shown) of NVSM 128 to store the data.

To access data stored in NVSM 128, controller 120 in one implementation reads current values for cells in NVSM 128 and decodes the current values into data that can be transferred to a host via interface 126.

Figure 2:
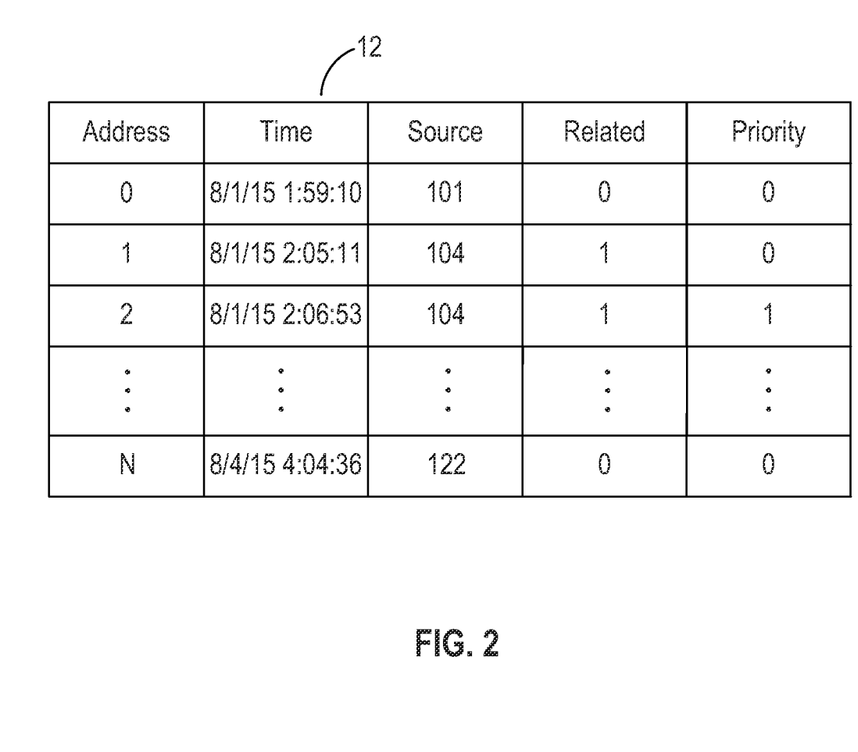
FIG. 2 depicts an example of metadata generated by a DSD for data received by the DSD according to an embodiment.

FIG. 2 depicts an example of metadata 12 that is generated by DSD 106 for data received from sensor 122 and devices 101 and 102 according to an embodiment. As shown in FIG. 2, metadata 12 includes an address for the data associated with the metadata, a time the data was received, an indication of a source of the received data, an indication of whether the data is related to other data stored in DSD 106, and a priority level of the data. Other implementations of metadata 12 may include different metadata than that shown in FIG. 2.

As discussed below with reference to FIG. 3, controller 120 may generate metadata 12 as part of a preprocessing of the data when the data is received by DSD 106. Metadata 12 can then later be used in managing retention of the received data in accordance with one or more retention policies of DSD 106.

In FIG. 2, each row represents a different instance of receiving data. The address of metadata 12 can correspond either directly or indirectly to a location where the associated data is stored in the NVM of DSD 106. The time can indicate when the data was received by DSD 106. The source indicates which device (e.g., sensor 122 or devices 101 or 104) provided the data to DSD 106.

The related indicator indicates whether the data is related to other data received by DSD 106 from a different source. For example, in a case where device 101 is a video camera and device 104 is a microphone in the same room as device 101, audio data received from device 104 may be indicated as being related to video data received from device 101 by using a flag or other indicator in metadata 12 for data received from device 104. In other implementations, data received from two or more devices may be indicated as being related by assigning each set of related devices with a particular value in metadata 12 so that metadata 12 can be sorted by one or more groups of related devices.

The priority indicator in metadata 12 indicates a priority level for the associated data. In one implementation, the priority level may be based on data received from another device indicating a high priority for the data. For example, sensor 122 can be a motion sensor and device 101 can be a video camera so that when sensor 122 detects motion, the data received from device 101 is indicated as having a higher priority over data from when there is no motion detected by sensor 122.

The devices used with DSD 106 are not limited to the examples provided above. For example, devices 101 or 104 in some implementations can include sensors located in machinery such as an engine or sensors that are used as part of a manufacturing process. Generally speaking, some embodiments of the invention may be applied to scenarios where a large amount of data is constantly being generated and for which there may be some analytical or historical reference value in later assesses, but the storage space is limited.

Data Retention Management Examples

Figure 3:
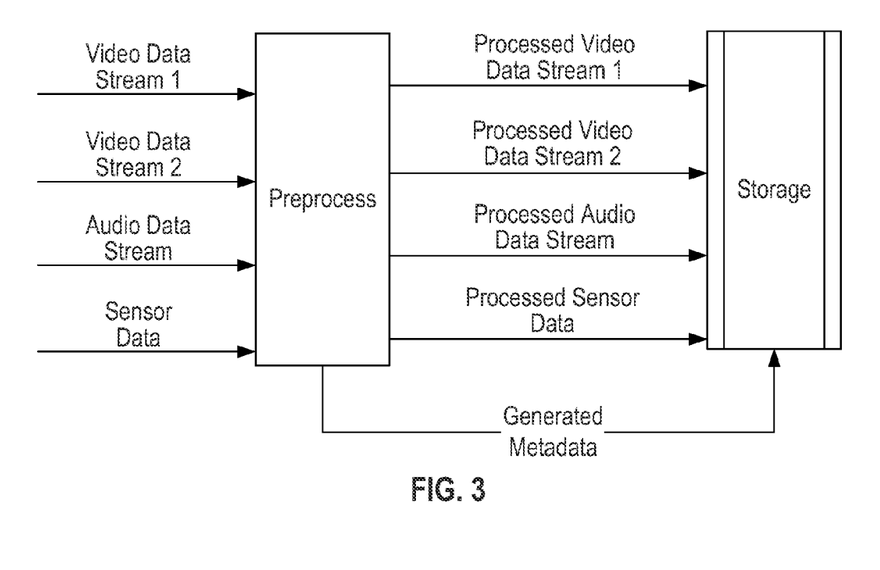
FIG. 3 is a block diagram illustrating preprocessing and storage of received data according to an embodiment.

FIG. 3 is a block diagram illustrating preprocessing and storage of received data according to an embodiment. In the example of FIG. 3, controller 120 performs a preprocessing of data streams and sensor data to generate metadata and processed data that is stored in an NVM of DSD 106.

The generated metadata can include, for example, one or more of the types of metadata shown in FIG. 2 for metadata 12 such as an indication of when the data was received, whether the received data is related to other data stored in NVM, the source of the received data, or a priority level for the received data.

In addition, the metadata can include a result of an analysis of the data performed as part of the preprocessing. In one example, the preprocessing may include an analysis of video data to determine a brightness of the video data such that metadata 12 includes an indication of when the brightness exceeds or falls below a brightness threshold. In such an example, controller 120 may later use this metadata to make decisions on which video data to keep and delete portions of the video data that may be too dark or too bright.

The generated metadata for the received data allows controller 120 to manage retention of the data or a data size of the data without having to rely on processing from an external host or a selection made by a user of DSD 106. By using the generated metadata, controller 120 can ordinarily be more selective in the data it retains or compresses so that certain data is retained or preserved longer than other data that may not be as important in light of retention policies implemented by DSD 106.

Figure 4:
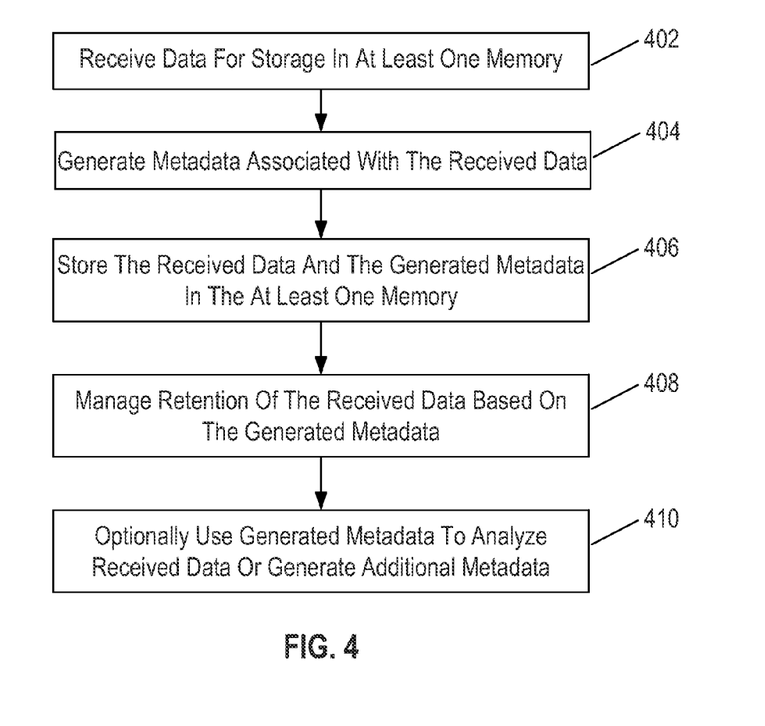
FIG. 4 is a flowchart for a retention management process according to an embodiment.

FIG. 4 is a flowchart for a retention management process that can be performed by controller 120 executing firmware 10 according to an embodiment. In block 402, controller 120 receives data from storage in at least one memory of DSD 106 such as disk 150 or NVSM 128. The data may be received as a continuous stream of data or as a burst of data from a sensing device such as device 101 or device 104, or the data may be more discrete such as an isolated value from sensor 122.

In block 404, controller 120 generates metadata 12 that is associated with the data received in block 402. For example, the metadata may include a timestamp indicating when the data is received, an indication of whether the data is related to other data stored in DSD 106, an indication of the source of the data, a priority level of the data, or a result of an analysis of the data.

In block 406, the received data and the generated metadata is stored in the at least one memory of DSD 106 (e.g., disk 150 or NVSM 128). In some cases, the generated metadata may be stored with the received data such as within or near the same track 152 on disk 150 so as to provide nearly simultaneous access of the received data with its associated metadata. In other implementations, the generated metadata may be stored in a different location from its associated data. Such an implementation may be possible in FIG. 1 where metadata 12 is stored in NVSM 128 and the associated data can be stored on disk 150. Storing metadata 12 and its associated data in different storage media can in some cases allow for a more efficient use of different types of storage media.

In one example, disk 150 can include overlapping tracks that are generally sequentially written using Shingled Magnetic Recording (SMR) that is well suited for archiving large amounts of streaming data. In such an example, a data steam from a video camera can be sequentially written in the overlapping tracks with little movement of head 136. NVSM 128 may then be used to store associated metadata that is generally smaller in size and may need to be accessed independently when evaluating the metadata to determine which video data should be kept when a remaining storage capacity of disk 150 reaches a high capacity threshold.

In block 408, controller 120 manages retention of the received data based on the generated metadata. Controller 120 may manage the retention of the received data by performing a selective retention action such as, for example, deletion of a portion of the data, compression of a portion of the data, or transferring a portion of the data to another storage device, such as remote DSD 109.

In block 410, controller 120 optionally uses the metadata generated in block 404 to analyze the received data or to generate additional metadata. For example, metadata 12 may be used to identify data received within a certain time period or data having a higher priority. The received data may also be further processed by controller 120 in block 410 to generate additional metadata. For example, controller 120 may analyze data received from device 101 within a certain timeframe to identify portions of the data including a facial recognition match and generate additional metadata indicating the portions of the data that include a match. In another example, controller 120 may use metadata 12 to identify data older than a particular time and compress such data, and generate additional metadata indicating that the data has been compressed.

Figure 5:
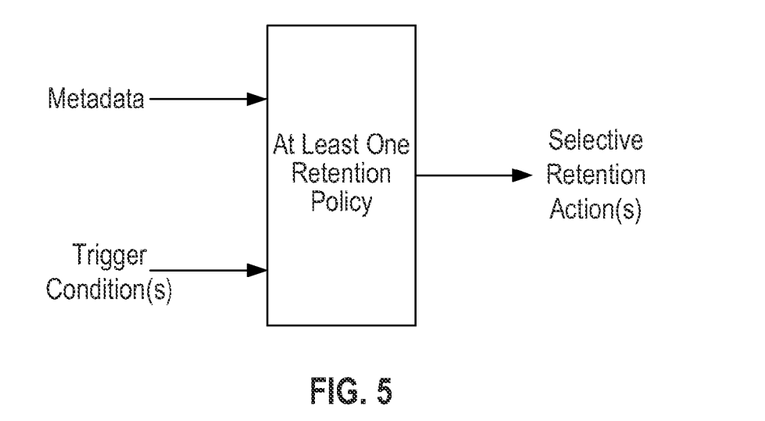
FIG. 5 is a block diagram illustrating the enforcement of at least one retention policy according to an embodiment.

FIG. 5 is a block diagram illustrating the enforcement of at least one retention policy according to an embodiment. In FIG. 5, controller 120 detects one or more trigger conditions that cause controller 120 to evaluate metadata 12 using at least one retention policy. The one or more retention policies can consider, for example, whether data has been stored for longer than a certain period of time, a priority level for data stored longer than a certain period of time, or a relation of data to other data stored in NVM. Based on the evaluation, controller 120 performs one or more selective retention actions on the data stored in at least one memory of DSD 106.

The trigger conditions in FIG. 5 can include, for example, an elapse of a predetermined amount of time, an input received from an external device, the receipt of new data for storage, or at least one memory reaching a high threshold storage capacity. In the case where the trigger condition is an elapsed amount of time, controller 120 may be configured to periodically evaluate the data stored in NVM using the generated metadata. In the case where the evaluation of the data is triggered by receiving an input from an external device, a host device connected to DSD 106 either directly through interface 126 or remotely via network 105 may command DSD 106 to evaluate its metadata using a retention policy to determine if space can be freed up in the NVM of DSD 106.

In the case where a high threshold storage capacity is reached, controller 120 may monitor the remaining available space for storing data in NVM of DSD 106. When the high threshold storage capacity is reached, controller 120 may perform one or more selective retention actions until a low threshold storage capacity is reached to generally maintain the amount of data stored in NVM between the low and high thresholds. As discussed above, the selective retention action can include, for example, deleting a portion of the data, compressing a portion of the data, or transferring a portion of the data to another DSD.

Figure 6:
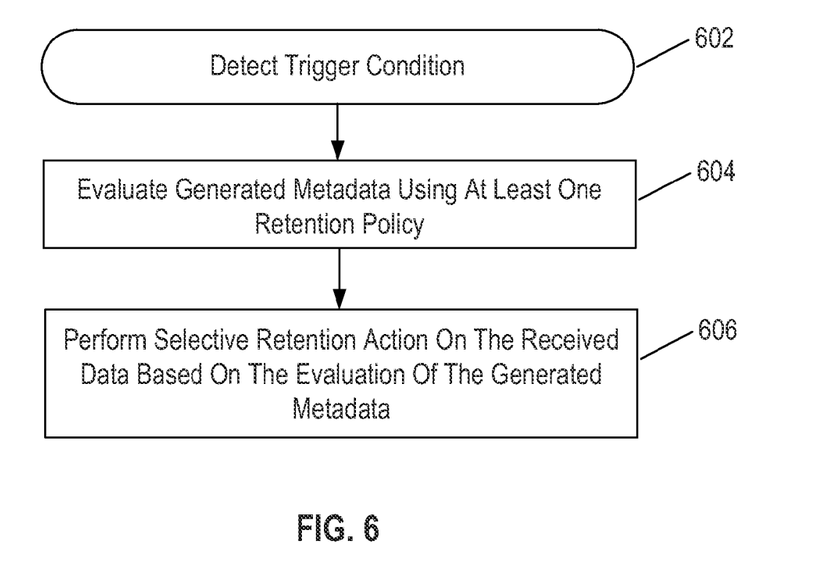
FIG. 6 is a flowchart for a selective retention process according to an embodiment.

FIG. 6 is a flowchart for a selective retention process that can be performed by controller 120 executing firmware 10 according to an embodiment. In block 602, controller 120 detects a trigger condition such as an elapse of a predetermined amount of time, an input received from an external device, or at least one memory (e.g., disk 150 or NVSM 128) reaching a high threshold storage capacity.

In block 604, controller 120 evaluates metadata 12 using at least one retention policy. In one example, controller 120 may identify data that has been stored longer than a threshold amount of time and then identify the data that has been stored longer than the threshold amount of time and not indicated as having a high priority.

In block 606, controller 120 performs a selective retention action on the received data stored in NVM based on the evaluation performed in block 604. Using the example given above, controller 120 may delete or compress any data identified as being stored longer than the threshold amount of time and not indicated as having a high priority.

Figure 7:
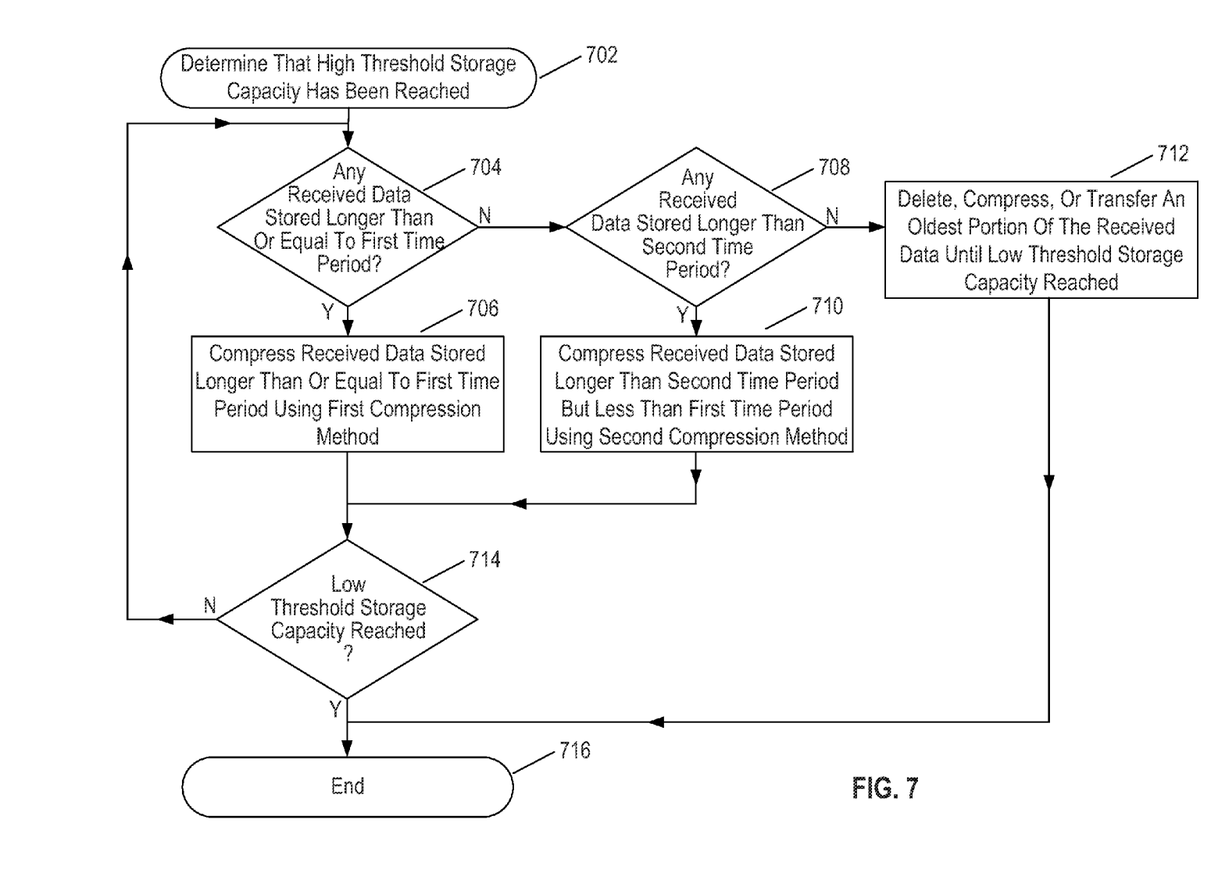
FIG. 7 is a flowchart for a selective retention process triggered by reaching a high threshold storage capacity according to an embodiment.

FIG. 7 is a flowchart for a selective retention process triggered by reaching a high threshold storage capacity according to an embodiment. The example process of FIG. 7 can, for example, be performed by controller 120 executing firmware 10 as a background activity.

In block 702, controller 120 determines that a high threshold storage capacity has been reached. This can be part of a storage capacity monitoring performed by controller 120 and can include one or more NVMs (e.g., disk 150 or NVSM 128) of DSD 106 storing a certain amount of data. The high threshold storage capacity may be for the data received from a particular device (e.g., device 101) or may be for the data received from all of the devices providing data for storage in DSD 106 (e.g., sensor 122 and devices 101 and 104). In other embodiments, the selective retention process may be triggered by other trigger conditions such as an external input or an elapsed amount of time.

In block 704, controller 120 determines whether any of the data received by DSD 106 and stored in NVM has been stored for longer than or equal to a first time period. For example, controller 120 may evaluate timestamps of metadata 12 to determine if there is any data stored in NVM that was received before two weeks ago.

If it is determined in block 714 that there is data stored longer or equal to the first time period, controller 120 in block 706 compresses such data using a first compression method. The first compression method can include one or more known compression methods. In block 714, controller 120 determines whether a low threshold storage capacity has been reached by compressing the data in block 706. If so, the process ends in block 716.

On the other hand, if the low threshold storage capacity has not been reached in block 714, the process returns to block 704. In other embodiments, block 714 may be omitted such that the process of FIG. 7 ends after the performance of a retention action such as the compression, deletion, or transferring of a portion of the data stored in DSD 106. In such embodiments, the process of FIG. 7 could then be initiated again if the high threshold storage capacity has been reached in block 702.

If there is not any data received by DSD 106 that has been stored longer than or equal to the first time period in block 704, controller 120 in block 708 determines whether any of the received data has been stored longer than a second time period that is less than the first time period. As with block 704, controller 120 can evaluate metadata 12 to determine whether any data has been stored longer than the second time period.

If it is determined in block 708 that there is data that has been stored longer than the second time period, controller 120 in block 710 compresses such data using a second compression method. The second compression method can, for example, use a lower compression ratio than a compression ratio used in the first compression method of block 706 so that data that has been stored longer is compressed more in block 706 than data compressed in block 710 since this data has not been stored for as long. In other implementations, the second compression method can use a higher compression ratio than used in the first compression method or may include a different algorithm for compressing data. In yet other implementations, the second compression method can include a second instance of compression using the first compression method of block 706 to further compress previously compressed data. In some embodiments, a compression method may include operations such as selective deletion and/or migration to another storage location.

After compressing the data in block 710, controller 120 determines whether the low capacity storage threshold has been reached in block 714. If so, the process ends in block 716. If not, the process returns to block 704 for further data retention management.

If it is determined in block 708 that there is not any data that has been stored for longer than the second period of time, controller 120 in block 712 deletes, compresses, or transfers an oldest portion of the data received by DSD 106 until the low threshold storage capacity is reached. The process of FIG. 7 then ends in block 716.

Figure 8A:
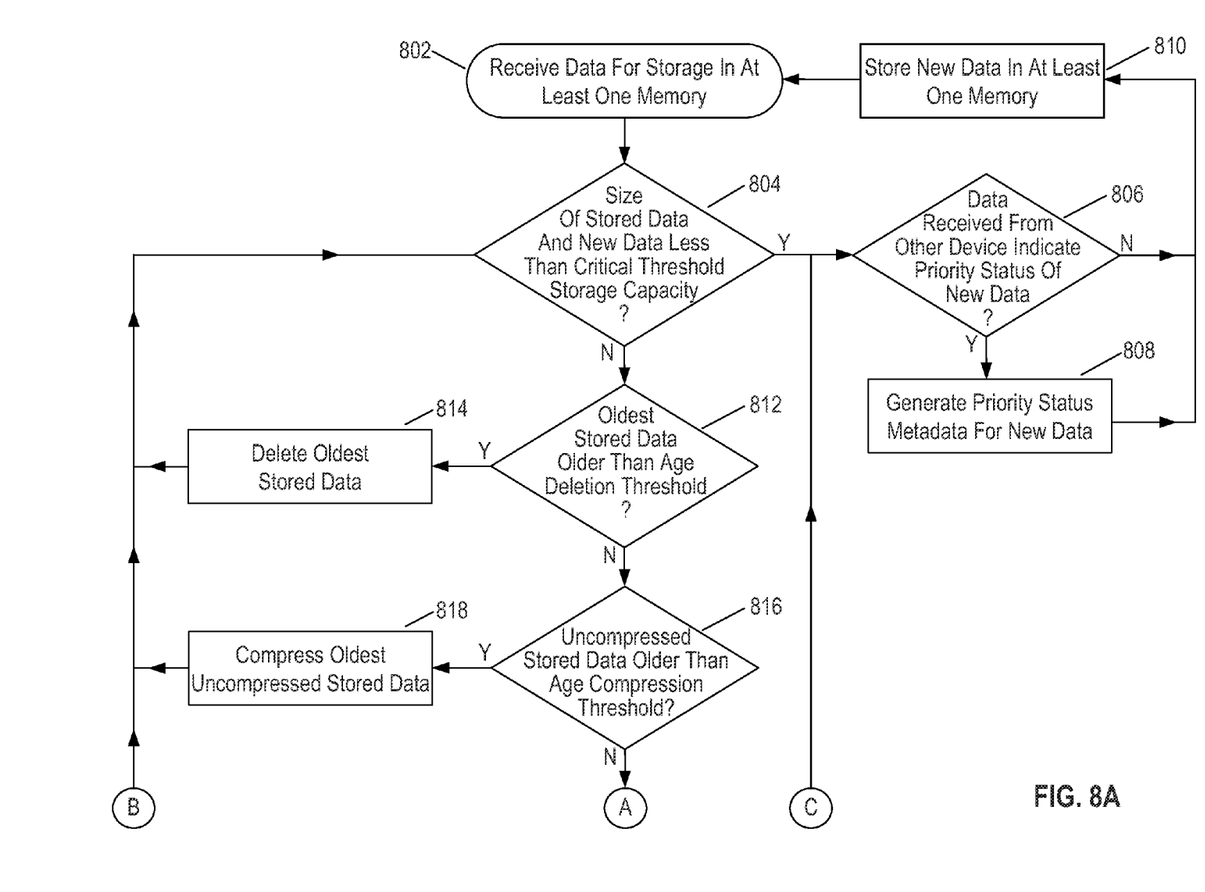
FIG. 8A is a flowchart for a selective retention process triggered by the receipt of new data for storage in a DSD according to an embodiment.
Figure 8B:
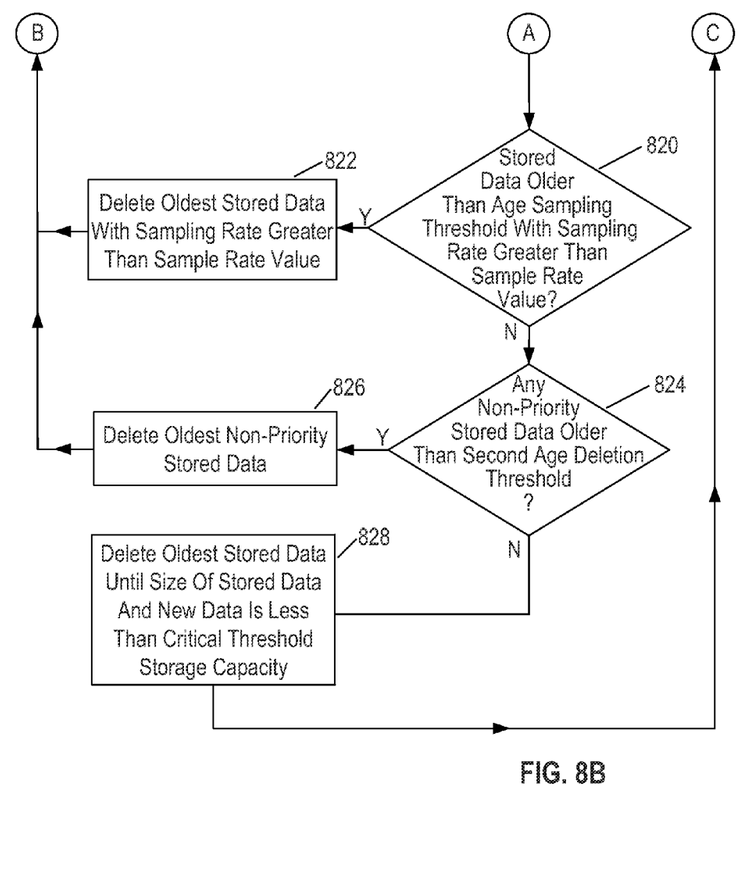
FIG. 8B is a continuation of the flowchart of FIG. 8A.

FIGS. 8A and 8B provide a flowchart for a selective retention process that is triggered by the receipt of new data according to an embodiment. The process of FIGS. 8A and 8B can be performed by controller 120 executing firmware 10.

In block 802, controller 120 receives data for storage in at least one memory of DSD 106. In block 804, controller 120 determines whether the size of the data stored in the at least one memory together with the new data received in block 802 is less than a critical threshold storage capacity. In one implementation, the critical threshold storage capacity can be a data capacity at which DSD 106 can no longer store new data in NVM. In other implementations, the critical threshold storage capacity can be a certain capacity before reaching the point when DSD 106 can no longer store new data in NVM.

In other embodiments, controller 120 may only determine the size of the data already stored in NVM rather than the size of the new data together with the data already stored in NVM. In addition, the size of the data considered in block 804 may be for the data received from a particular device or may be a total data size including data received from all devices.

If it is determined that the data size in block 804 is less than the critical threshold storage capacity, controller 120 checks in block 806 whether data received from another device indicates a priority status for the data received in block 802. In some implementations, the receipt of other data that is related to the data received in block 802 can indicate a higher priority of the received data. For example, an input received from a device such as an input indicating that a doorbell was pressed can cause controller 120 to determine that video data received from a camera has a higher priority for a time period around the receipt of the input indicating the doorbell was pressed.

If it is determined that the data from the other device indicates a priority status, controller 120 in block 808 generates priority status metadata for the data received in block 802. In the example of metadata 12 in FIG. 2, this can include setting a flag indicating a high priority for the received data.

The new data is stored in the at least one memory in block 810. Metadata associated with the new data, such as any metadata generated in block 808, may also be stored in the at least one memory in block 810.

If it is determined in block 804 that the size of the stored data and the new data is not less than the critical threshold storage capacity, controller 120 determines in block 812 whether the oldest data stored in the at least one memory is older than an age deletion threshold. In this regard, controller 120 can use metadata 12 to determine the age of the data stored in the at least one memory. If there is data older than the age deletion threshold, controller 120 deletes the oldest data in block 814 and the process returns to block 804 to determine whether the size of the stored data and the new data received in block 802 is less than the critical threshold storage capacity.

If it is determined in block 812 that the oldest data stored in the least one memory is not older than the age deletion threshold, controller 120 in block 816 determines whether there is any uncompressed data that has been stored longer than an age compression threshold. Metadata 12 may be used to identify data that has been stored longer than the age compression threshold. Analysis of the data or analysis of metadata 12 indicating the compression of data can be used to determine whether there is any uncompressed data that has been stored longer than the age compression threshold.

If it is determined in block 816 that there is uncompressed data that is older than the age compression threshold, controller 120 in block 818 compresses the oldest uncompressed stored data and the process returns to block 804.

If there is no uncompressed data that is older than the age compression threshold in block 816, the process proceeds to block 820 in FIG. 8B. In block 820, controller 120 determines whether there is any data stored in the at least one memory that is older than an age sampling threshold that has a sampling rate greater than a predetermined sample rate value. In one example, the stored data can include video data and controller 120 in block 820 can determine whether any of the data that is older than a certain age has a frame rate greater than a particular frame rate or predetermined sample rate value.

If it is determined that there is data meeting the age and sample rate criteria of block 820, controller 120 in block 822 deletes the oldest data with a sampling rate greater than the sample rate value. In other embodiments, controller 120 in block 822 may instead compress or reduce the sample rate of the oldest data.

If there is no data that meets the age and sample rate criteria in block 820, controller 120 in block 824 determines whether there is any stored data that does not have a priority status that is older than a second age deletion threshold. If so, controller 120 in block 826 deletes the oldest non-priority data stored in the at least one memory.

On the other hand, if there is no data meeting the criteria in block 824, controller 120 in block 828 deletes the oldest stored data until the size of the new data and the stored data is less than the critical threshold storage capacity. The deleted data may, for example, include the deletion of data starting with the oldest data and continuing toward more recently stored data until falling below the critical threshold storage capacity. In other embodiments, the deleted data may include a predetermined amount of data or the oldest data within a predetermined timeframe, such as the deletion of all data older than two weeks. The process of FIGS. 8A and 8B then returns to block 806 in FIG. 8A to determine whether data received from another device indicates a priority status of the new data received in block 802.

By using metadata generated by DSD 106, it is ordinarily possible for DSD 106 to consider other factors in addition to or in place of only considering an age of the data in determining which data to keep or compress. In addition, the metadata generated by DSD 106 can also allow DSD 106 to manage the retention of data on its own without the need for involvement of a host.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   at least one memory for storing data; and
   a controller configured to:
   receive data from a first device and from a second device;
   generate metadata for the data received from the first device using the data received from the second device, wherein the generated metadata includes at least one of an indication of whether data received from the first device is related to data received from the second device, and an indication of a priority level of the data received from the first device based on the data received from the second device;
   store the data received from the first device and the generated metadata in the at least one memory; and
   manage retention in the at least one memory of the data received from the first device based on the generated metadata.

2. The DSD of claim 1, wherein the controller is further configured to generate metadata including at least one of an indication of a time that data was received, an indication of a source of received data, and a result from an analysis of received data.

3. The DSD of claim 1, wherein the controller is further configured to manage retention by:
   detecting a trigger condition;
   evaluating the generated metadata using at least one retention policy; and
   performing a selective retention action on the data received from the first device that is stored in the at least one memory based on the evaluation of the generated metadata.

4. The DSD of claim 3, wherein the trigger condition includes at least one of an elapse of a predetermined amount of time, receiving an input from an external device, receiving new data for storage in the at least one memory, and the at least one memory reaching a high threshold storage capacity.

5. The DSD of claim 3, wherein in performing the selective retention action the controller is further configured to delete at least a portion of the received data stored in the at least one memory based on the evaluation of the generated metadata.

6. The DSD of claim 3, wherein in performing the selective retention action the controller is further configured to compress at least a portion of the received data stored in the at least one memory based on the evaluation of the generated metadata.

7. The DSD of claim 3, wherein the controller is further configured to:
   in evaluating the generated metadata, determine whether any of the data received from the first device has been stored in the at least one memory for longer than or equal to a first time period; and
   in performing the selective retention action, compress using a first compression method any data received from the first device that has been stored in the at least one memory for longer than or equal to the first time period.

8. The DSD of claim 7, wherein the controller is further configured to:
   in evaluating the generated metadata, determine whether any of the data received from the first device has been stored in the at least one memory for longer than a second time period but less than the first time period; and
   in performing the selective retention action, compress using a second compression method any data received from the first device that has been stored in the at least one memory for longer than the second time period but less than the first time period.

9. The DSD of claim 3, wherein in performing the selective retention action the controller is further configured to transfer at least a portion of the received data stored in the at least one memory to a remote memory outside of the at least one memory based on the evaluation of the generated metadata.

10. The DSD of claim 3, wherein the data received from the first device includes video data, and wherein in performing the selective retention action the controller is further configured to decrease a frame rate of the received video data based on the evaluation of the generated metadata.

11. The DSD of claim 1, wherein the controller is further configured to use the generated metadata after storing the data received from the first device in the at least one memory to analyze the data received from the first device or to generate additional metadata.

12. The DSD of claim 11, wherein the controller is further configured to delete the data received from the first device but retain the generated additional metadata.

13. A method of operating a Data Storage Device (DSD) including at least one memory for storing data, the method comprising:
   receiving data from a first device and from a second device;
   generating metadata for the data received from the first device using the data received from the second device, wherein the generated metadata includes at least one of an indication of whether data received from the first device is related to data received from the second device, and an indication of a priority level of the data received from the first device based on the data received from the second device;
   storing the data received from the first device and the generated metadata in the at least one memory; and
   managing retention in the at least one memory of the data received from the first device based on the generated metadata.

14. The method of claim 13, further comprising generating metadata including at least one of an indication of a time that data was received, an indication of a source of received data, and a result from an analysis of received data.

15. The method of claim 13, wherein retention of the received data is managed by:
   detecting a trigger condition;
   evaluating the generated metadata using at least one retention policy; and
   performing a selective retention action on the data received from the first device that is stored in the at least one memory based on the evaluation of the generated metadata.

16. The method of claim 15, wherein the trigger condition includes at least one of an elapse of a predetermined amount of time, receiving an input from an external device, receiving new data for storage in the at least one memory, and the at least one memory reaching a high threshold storage capacity.

17. The method of claim 15, wherein performing the selective retention includes deleting at least a portion of the received data stored in the at least one memory based on the evaluation of the generated metadata.

18. The method of claim 15, wherein performing the selective retention action includes compressing at least a portion of the received data stored in the at least one memory based on the evaluation of the generated metadata.

19. The method of claim 15, further comprising:
in evaluating the generated metadata, determining whether any of the data received from the first device has been stored in the at least one memory for longer than or equal to a first time period; and
in performing the selective retention action, compressing using a first compression method any data received from the first device that has been stored in the at least one memory for longer than or equal to the first time period.

20. The method of claim 19, further comprising:
in evaluating the generated metadata, determining whether any of the data received from the first device has been stored in the at least one memory for longer than a second time period but less than the first time period; and
in performing the selective retention action, compressing using a second compression method any data received from the first device that has been stored in the at least one memory for longer than the second time period but less than the first time period.

21. The method of claim 15, wherein in performing the selective retention action, the method further comprises transferring at least a portion of the received data stored in the at least one memory to a remote memory outside of the at least one memory based on the evaluation of the generated metadata.

22. The method of claim 15, wherein the data received from the first device includes video data, and wherein performing the selective retention action includes decreasing a frame rate of the received video data based on the evaluation of the generated metadata.

23. The method of claim 13, further comprising using the generated metadata after storing the data received from the first device in the at least one memory to analyze the data received from the first device or to generate additional metadata.

24. The method of claim 23, further comprising deleting the data received from the first device but retaining the generated additional metadata.

25. A non-transitory computer readable medium storing computer-executable instructions for operating a Data Storage Device (DSD) including at least one memory for storing data, wherein when the computer-executable instructions are executed by a controller of the DSD, the computer-executable instructions cause the controller to:
receive data from a first device and from a second device;
generate metadata for the data received from the first device using the data received from the second device, wherein the generated metadata includes at least one of an indication of whether data received from the first device is related to data received from the second device, and an indication of a priority level of the data received from the first device based on the data received from the second device;
store the data received from the first device and the generated metadata in the at least one memory; and
manage retention in the at least one memory of the data received from the first device based on the generated metadata.

* * * * *